US012664732B2

(12) United States Patent

Huang et al.

(10) Patent No.: US 12,664,732 B2
(45) Date of Patent: Jun. 23, 2026

(54) METHODS AND SYSTEMS FOR GENERATING A THREE-DIMENSIONAL REPRESENTATION OF A SCENE

(71) Applicants:HUAWEI TECHNOLOGIES CANADA CO., LTD., Kanata (CA); Chengjie Huang, Kitchener (CA); Vahdat Abdelzad, Waterloo (CA); Sean Albert Sedwards, Kitchener (CA); Krzysztof Czarnecki, Waterloo (CA)

(72) Inventors: Chengjie Huang, Kitchener (CA); Vahdat Abdelzad, Waterloo (CA); Sean Albert Sedwards, Kitchener (CA); Krzysztof Czarnecki, Waterloo (CA); Eduardo R. Corral-Soto, Toronto (CA)

( * ) Notice: Subject to any disclaimer, the term of this patent is extended or adjusted under 35 U.S.C. 154(b) by 140 days.

(21) Appl. No.: 18/772,697

(22) Filed: Jul. 15, 2024

(65) Prior Publication Data

US 2026/0017894 A1      Jan. 15, 2026

(51) Int. Cl.
| | |
|---|---|
| *G06T 19/00* | (2011.01) |
| *G06T 7/20* | (2017.01) |
| *G06T 7/62* | (2017.01) |
| *G06T 7/70* | (2017.01) |
| *G06V 10/25* | (2022.01) |

(52) U.S. Cl.
CPC ............... *G06T 19/00* (2013.01); *G06T 7/20* (2013.01); *G06T 7/62* (2017.01); *G06T 7/70* (2017.01); *G06V 10/25* (2022.01); *G06V 2201/07* (2022.01)

(58) Field of Classification Search
CPC .. G06T 19/00; G06T 7/20; G06T 7/62; G06T 7/70; G06V 10/25; G06V 2201/07
See application file for complete search history.

(56) References Cited

U.S. PATENT DOCUMENTS

| | | | |
|---|---|---|---|
| 2012/0041722 A1* | 2/2012 | Quan ..................... | G06T 7/579 |
| | | | 703/1 |
| 2016/0005211 A1* | 1/2016 | Sarkis ................... | G06T 1/0007 |
| | | | 345/419 |
| 2020/0005447 A1* | 1/2020 | Salgian ................... | G06T 17/00 |
| 2022/0295032 A1* | 9/2022 | Jayaram ................. | G06V 10/26 |
| 2023/0324911 A1* | 10/2023 | Henry ...................... | G05D 1/46 |
| | | | 701/2 |
| 2024/0070979 A1* | 2/2024 | Ban .......................... | G06T 17/20 |
| 2024/0265630 A1* | 8/2024 | Vianello ................. | G06F 30/23 |

* cited by examiner

*Primary Examiner* — Jitesh Patel
(74) *Attorney, Agent, or Firm* — BCF LLP

(57) ABSTRACT

Systems and methods for generating a three-dimensional (3D) representation of a scene are provided. The method comprises: accessing a series of 3D point clouds; detecting an object in a first 3D point cloud from the series; upon receiving a second 3D point cloud successive to the first 3D point cloud in the series of 3D point clouds: determining an estimated bounding box indicative of an estimated position of the object in the second 3D point cloud; determining a number N of 3D point clouds from the series of 3D point clouds preceding the second 3D point based on a dynamic parameter of the object in the first 3D point cloud; and generating an augmented 3D point cloud by aggregating data points representative of the object from the N 3D point clouds. The present method may help generate 3D points clouds enabling for more accurate determination of driving scenarios.

20 Claims, 7 Drawing Sheets

700

702 ACCESSING A SERIES OF 3D POINT CLOUDS

704 DETECTING AN OBJECT IN A FIRST 3D POINT CLOUD FROM THE SERIES

706 DETERMINE AN ESTIMATED BOUNDING BOX INDICATIVE OF AN ESTIMATED POSITION OF THE OBJECT IN A SECOND 3D POINT CLOUD

708 DETERMINING A NUMBER N OF 3D POINT CLOUDS

710 GENERATING AN AUGMENTED 3D POINT CLOUD

METHODS AND SYSTEMS FOR GENERATING A THREE-DIMENSIONAL REPRESENTATION OF A SCENE

FIELD

The present technology relates generally to computer vision and object detection, and more particularly to systems and methods for generating a three-dimensional (3D) representation of a scene.

BACKGROUND

LiDAR-based 3D object detection has recently gained traction in autonomous driving systems. Current 3D object detectors may deliver detections from aggregated inputs comprising multiple consecutive frames. One widely embraced technique for integrating multi-frame sequential point clouds is what may be referred to as "naive aggregation," where a fixed number of frames are concatenated post ego-motion correction. In the context of the present specification the term "ego-motion" denotes a 3D motion of a LIDAR sensor itself within a surrounding area of a fully or semi-autonomous vehicle in which a given autonomous driving system has been installed.

However, naive aggregation encounters two fundamental challenges. Firstly, the efficacy of multi-frame aggregation diminishes with an increase in the number of frames used, eventually leading to a deterioration in overall detection performance. This degradation arises from a trade-off between static and dynamic object detection performance. Specifically, static object detection benefits from a greater number of aggregated frames because the point clouds of static objects are inherently aligned, yielding denser and more comprehensive geometry. Conversely, the detection of dynamic objects suffers when too many frames are aggregated, as the resulting point clouds become distorted due to motion, resulting in a "smudge" effect that may reduce detection performances.

The second challenge lies in the increased computational cost associated with aggregation, stemming from the heightened density of input point clouds. For example, transitioning from 3-frame to 16-frame aggregation raises the inference time from 181 milliseconds to 271 milliseconds using the current technologies (e.g. VoxelNext model).

Therefore, systems that can perform reliable aggregation with relatively low computer resources and computing time may be desirable.

SUMMARY

Developers have devised methods and devices for overcoming at least some drawbacks present in prior art solutions.

In accordance with a first board aspect of the present technology, there is provided a computer-implemented method for generating a three-dimensional (3D) representation of a scene. The method comprises: accessing a series of 3D point clouds, each 3D point cloud comprising a plurality of data points and being associated with a respective timestamp indicative of a corresponding moment in time; detecting an object in a first 3D point cloud from the series, the detecting comprising: determining a bounding box indicative of a position of the object in the first 3D point cloud; and determining a dynamic parameter of the object at the respective timestamp; upon receiving a second 3D point cloud successive to the first 3D point cloud in the series of 3D point clouds: determining an estimated bounding box indicative of an estimated position of the object in the second 3D point cloud based on the bounding box and the dynamic parameter of the object in the first 3D point cloud; determining a number N of 3D point clouds from the series of 3D point clouds preceding the second 3D point based on the dynamic parameter of the object in the first 3D point cloud; and generating an augmented 3D point cloud by aggregating data points representative of the object from the N 3D point clouds preceding the second 3D point cloud in the series of 3D point clouds with data points of the second 3D point cloud.

In some implementations of the method, the N 3D point clouds are a subseries of the series of 3D point clouds immediately preceding the second 3D point cloud.

In some implementations of the method, in a given 3D point cloud, each object is associated with a bounding box delimiting data points of the given 3D point cloud representative of the object.

In some implementations of the method, for each object, a size of the bounding box on the second 3D point cloud is adjusted based on the dynamic parameter of the object determined using data points of the first 3D point cloud.

In some implementations of the method, the method further comprises adjusting a position of the bonding box of the object based on the estimated position thereof and the dynamic parameter of the object determined using data points of the first 3D point cloud.

In some implementations of the method, the 3D point cloud are representations of the scene captured at a predetermined rate f, and wherein the adjusting the position of the bonding box is further based on the pre-determined rate f.

In some implementations of the method, the dynamic parameter of the object is selected from a group of parameters comprising: a velocity of the object; an object type of the object, a size of the object, a location of the object, a number of data points representative of the object on the second 3D point cloud and an occlusion level of the object.

In some implementations of the method, the dynamic parameter of the object is a velocity thereof, and wherein the number N is determined according to a formula:

$$N = \eta(|v_{\tau-1}|) = \min(1/\alpha|v_{\tau-1}| + n_{min}; n_{max}),$$ where $\alpha$ is a pre-determined hyperparameter, $v_{96-1}$ is the velocity of the object determined on the first 3D point cloud and $n_{min}$ and $n_{max}$ are respectively a first and a second pre-determined thresholds.

In some implementations of the method, the series of 3D point clouds are representations of the scene captured at a pre-determined rate f, and wherein determining the estimated position of the object is further based on the pre-determined rate f.

In some implementations of the method, the method further comprises generating a two-dimensional (2D) range image based on a projection of the aggregated data points on a 2D plane; and transmitting the 2D image to an object-detection module.

In some implementations of the method, the method further comprises identifying residual data points among the data points of the second 3D point cloud based on the series of 3D point clouds; determining a range image based on the data points of the second 3D point cloud; identifying emerging data points among the data points of the second 3D point cloud using the range image; and determining an intersection between the emerging data points and the residual data points as being data points representative of the object.

In some implementations of the method, the determining the range image comprises executing a spherical projection and quantization of the residual data points.

In accordance with a second board aspect of the present technology, there is provided a system for generating a three-dimensional (3D) representation of a scene. The system comprises a controller and a memory storing a plurality of executable instructions which, when executed by the controller, cause the system to: access a series of 3D point clouds, each 3D point cloud comprising a plurality of data points and being associated with a respective timestamp indicative of a corresponding moment in time; detect an object in a first 3D point cloud from the series, the detecting comprising: determine a bounding box indicative of a position of the object in the first 3D point cloud; and determine a dynamic parameter of the object at the respective timestamp; upon receiving a second 3D point cloud successive to the first 3D point cloud in the series of 3D point clouds: determine an estimated bounding box indicative of an estimated position of the object in the second 3D point cloud based on the bounding box and the dynamic parameter of the object in the first 3D point cloud; determine a number N of 3D point clouds from the series of 3D point clouds preceding the second 3D point based on the dynamic parameter of the object in the first 3D point cloud; and generate an augmented 3D point cloud by aggregating data points representative of the object from the N 3D point clouds preceding the second 3D point cloud in the series of 3D point clouds with data points of the second 3D point cloud.

In some implementations of the system, the N 3D point clouds are a subseries of the series of 3D point clouds immediately preceding the second 3D point cloud.

In some implementations of the system, in a given 3D point cloud, each object is associated with a bounding box delimiting data points of the given 3D point cloud representative of the object.

In some implementations of the system, for each object, a size of the bounding box on the second 3D point cloud is adjusted based on the dynamic parameter of the object determined using data points of the first 3D point cloud.

In some implementations of the system, the system is further configured to adjust a position of the bonding box of the object based on the estimated position thereof and the dynamic parameter of the object determined using data points of the first 3D point cloud.

In some implementations of the system, the series of 3D point clouds are representations of the scene captured at a pre-determined rate f, and wherein the adjusting the position of the bonding box is further based on the pre-determined rate f.

In some implementations of the system, the dynamic parameter of the object is selected in a group of parameters comprising: a velocity of the object; an object type of the object, a size of the object, a location of the object, a number of data points representative of the object on the second 3D point cloud and an occlusion level of the object.

In some implementations of the system, the dynamic parameter of the object is a velocity thereof, and wherein the number N is determined according to a formula:

$$N = \eta(|v_{\tau\text{-}1}|) = \min(1/\alpha|v_{\tau\text{-}1}| + n_{min}; n_{max}),$$ where $\alpha$ is a pre-determined hyperparameter, $v_{\tau\text{-}1}$ is the velocity of the object determined on the first 3D point cloud and $n_{min}$ and $n_{max}$ are respectively a first and a second pre-determined thresholds.

In some implementations of the system, the series of 3D point clouds are representations of the scene captured at a pre-determined rate f, and wherein determining the estimated position of the object is further based on the pre-determined rate f.

In some implementations of the system, the system is further configured to: generate a two-dimensional (2D) range image based on a projection of the aggregated data points on a 2D plane; and transmit the 2D image to an object-detection module.

In some implementations of the system, the system is further configured to: identify residual data points among the data points of the second 3D point cloud based on the series of 3D point clouds; determine a range image based on the data points of the second 3D point cloud; identify emerging data points among the data points of the second 3D point cloud using the range image; and determine an intersection between the emerging data points and the residual data points as being data points representative of the object.

In some implementations of the system, the determining the range image comprises executing a spherical projection and quantization of the residual data points.

In another aspect, embodiments of this disclosure provide a computer readable storage medium, comprising one or more instructions, wherein when the one or more instructions are run on a computer, the computer performs any of the methods disclosed herein.

In another aspect, embodiments of this disclosure provide a non-transitory computer-readable medium storing instruction the instructions causing a processor in a device to implement any of the methods disclosed herein.

In another aspect, embodiments of this disclosure provide a device configured to perform any of the methods disclosed herein.

In another aspect, embodiments of this disclosure provide a processor, configured to execute instructions to cause a device to perform any of the methods disclosed herein.

In another aspect, embodiments of this disclosure provide an integrated circuit configure to perform any of the methods disclosed herein.

According to one aspect of this disclosure, there is provided a module comprising: one or more circuits for performing any of the methods disclosed herein.

According to one aspect of this disclosure, there is provided an apparatus comprising: one or more processors functionally connected to one or more memories for performing any of the methods disclosed herein.

According to one aspect of this disclosure, there is provided an apparatus configured to perform any of the methods disclosed herein.

In some embodiments the apparatus comprises one or more units configured to perform the above-described method.

According to one aspect of this disclosure, there is provided one or more non-transitory, computer-readable storage media comprising computer-executable instructions, wherein the instructions, when executed, cause at least one processing unit, at least one processor, or at least one circuits to perform any of the methods disclosed herein.

According to one aspect of this disclosure, there is provided one or more computer-readable storage media storing a computer program, wherein, when the computer program is executed by an apparatus, the apparatus is enabled to implement any of the methods disclosed herein.

According to one aspect of this disclosure, there is provided a computer program product including one or more instructions, wherein, when the instructions are executed by an apparatus, the apparatus is enabled to implement any of the methods disclosed herein.

According to one aspect of this disclosure, there is provided a computer program, wherein, when the computer program is executed by a computer, an apparatus is enabled to implement any of the methods disclosed herein.

According to one aspect of this disclosure, there is provided a system comprising a node for performing any of the methods disclosed herein.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers. It can be said that a database is a logically ordered collection of structured data kept electronically in a computer system.

In the context of the present specification, the expression "information" includes information of any nature or kind whatsoever capable of being stored in a database. Thus, information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
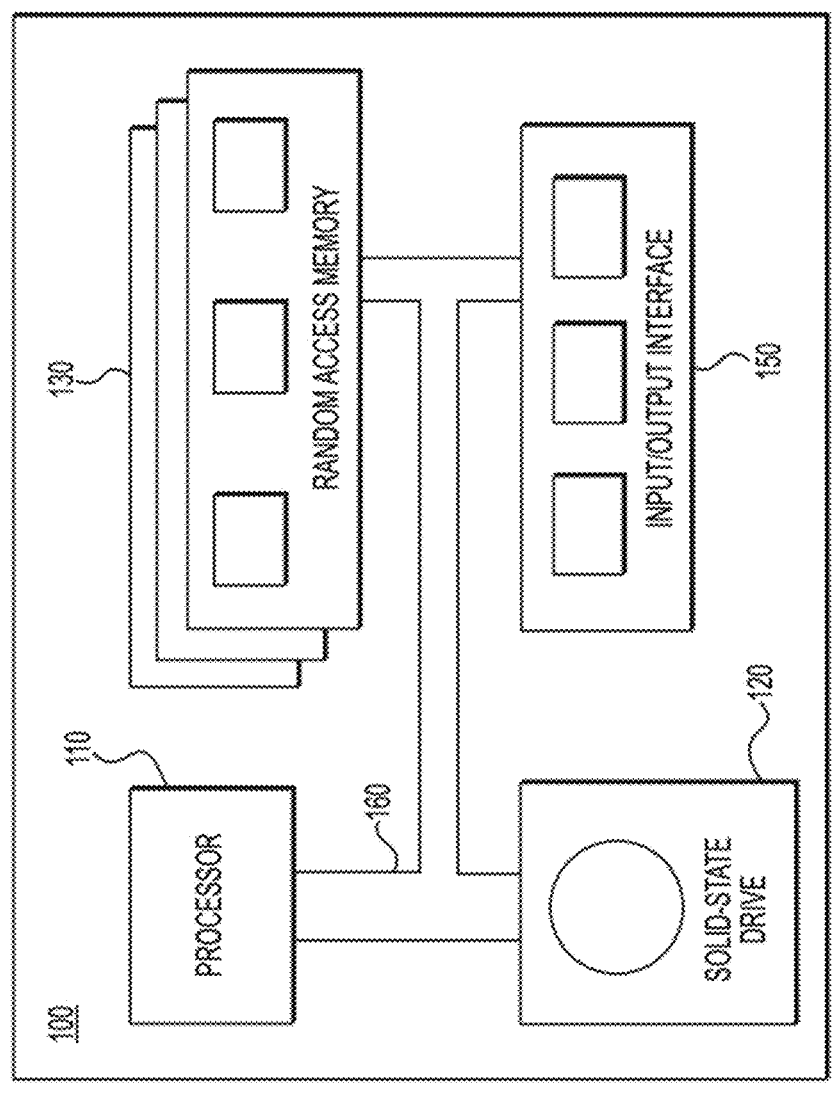
FIG. 1 illustrates an example of a computing device that may be used to implement any of the methods described herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some implementations of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

FIG. 1 illustrates a diagram of a computing environment 100 in accordance with an implementation of the present technology is shown. In some implementations, the computing environment 100 may be implemented by any of a conventional personal computer, a computer dedicated to operating and/or monitoring systems relating to a data center, a controller and/or an electronic device (such as, but not limited to, a mobile device, a tablet device, a server, a controller unit, a control device, a monitoring device etc.) and/or any combination thereof appropriate to the relevant task at hand. In some implementations, the computing environment 100 comprises various hardware components including one or more single or multi-core processors collectively represented by a processor 110, a solid-state drive 120, a random-access memory 130 and an input/output interface 150.

In some implementations, the computing environment 100 may also be a sub-system of one of the above-listed systems. In some other implementations, the computing environment 100 may be an "off the shelf" generic computer system. In some implementations, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random-access memory 130 and executed by the processor 110 for generating driving scenarios for Autonomous Driving Systems (ADS). For example, the program instructions may be part of a library or an application.

In some implementations of the present technology, the computing environment 100 may be implemented as part of a cloud computing environment. Broadly, a cloud computing environment is a type of computing that relies on a network of remote servers hosted on the internet, for example, to store, manage, and process data, rather than a local server or personal computer. This type of computing allows users to access data and applications from remote locations, and provides a scalable, flexible, and cost-effective solution for data storage and computing. Cloud computing environments can be divided into three main categories: Infrastructure as a Service (IaaS), Platform as a Service (PaaS), and Software as a Service (SaaS). In an IaaS environment, users can rent virtual servers, storage, and other computing resources from a third-party provider, for example. In a PaaS environment, users have access to a platform for developing, running, and managing applications without having to manage the underlying infrastructure. In a SaaS environment, users can access pre-built software applications that are hosted by a third-party provider, for example. In summary, cloud computing environments offer a range of benefits, including cost savings, scalability, increased agility, and the ability to quickly deploy and manage applications.

In the context of the present technology, the processor 110 may be configured to receive input data and generate driving scenarios based on said input. Broadly, the processor 110 may be part of a driving scenario generating system and is configured to execute one or more computer-implemented methods designed to ameliorate conventional driving scenario generating techniques.

Figure 2:
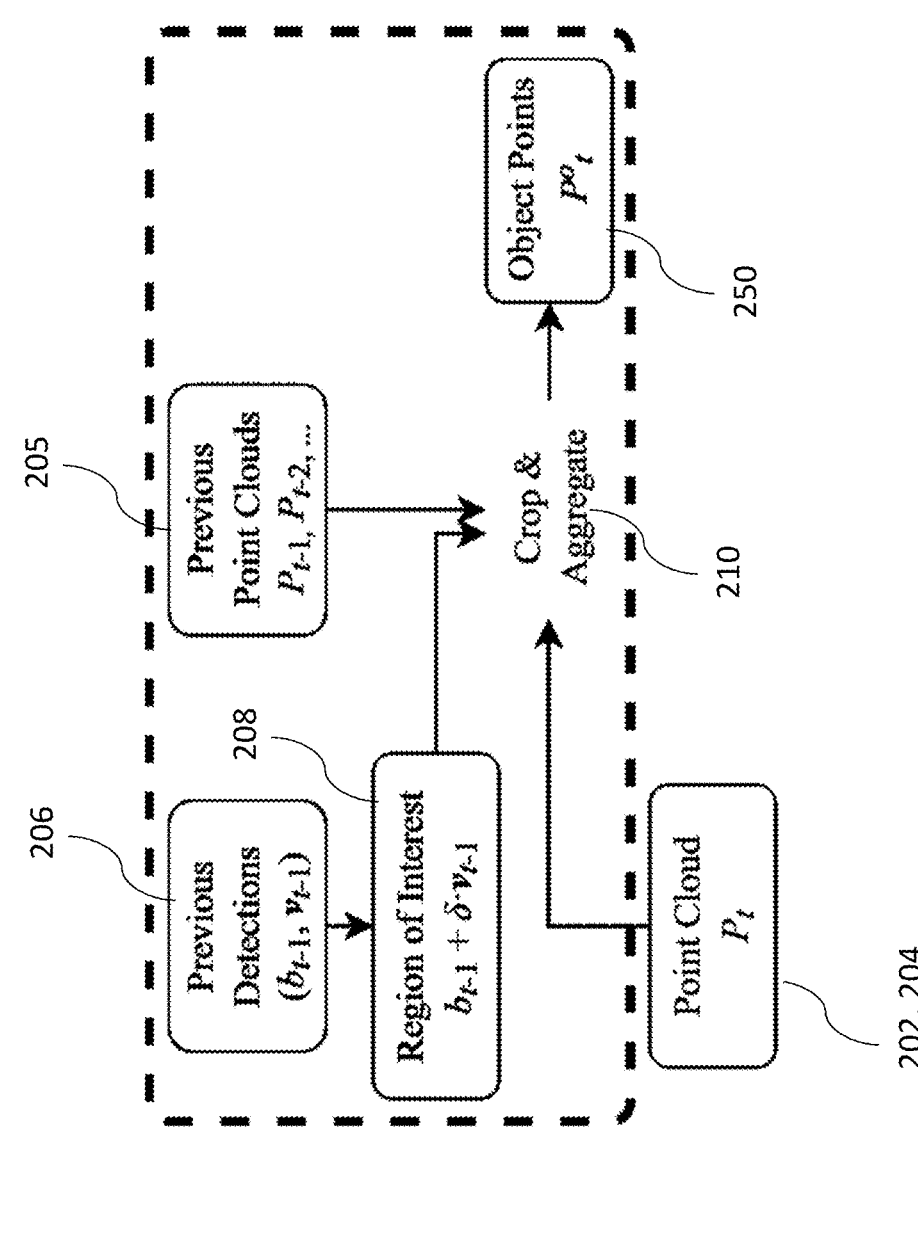
FIG. 2 illustrates a pipeline for executing variable aggregation of three-dimensional (3D) points clouds in accordance with at least some non-limiting implementations of the present technology.

With reference to FIG. 2, there is depicted a variable aggregation pipeline 200 executable by the computing device 100, in accordance with at least some implementations of the present technology. It is contemplated that the variable aggregation pipeline 200 may be implemented by other computer systems that are configured to perform aggregation of 3D point clouds, without departing from the scope of the present technology.

Broadly speaking, a given 3D point cloud includes a plurality of data points representative of a scene and objects within the scene. Each data point may be associated with features such as an identification of an object the data point is representative of, a position (e.g. XYZ coordinates), scale (i.e. size), rotation, visual features (appearance (RGB, texture, reflections, luminosity, specular properties, etc.), semantic features (panoptic, language, etc.), opacity features (transparency/density), motion feature (static or dynamic depending if the corresponding object the data points represents is moving or not relatively to the world coordinates) and additional transformation features (e.g. pose corrections, camera exposure estimation, camera extrinsic/intrinsic parameter correction, etc.).

In the context of the present disclosure, each 3D point cloud may correspond to a frame of a sequence captured by a capturing device (e.g. a LiDAR), and aggregating 3D point clouds refers to combining multiple consecutive frames of 3D point cloud data into a single, unified representation. The aggregated 3D point cloud may be formed by aligning the individual frames to a common reference frame and then merging them together. In this illustrative implementation, the 3D point cloud are representative of a scene seen by an ego-vehicle and the present technology is applied to 3D object detection for autonomous driving systems (ADS). However, any system variation configured to aggregate a plurality of 3D point clouds can be adapted to execute implementations of the present technology, once teachings presented herein are appreciated.

Referring back to FIG. 2, the variable aggregation pipeline 200 uses a given 3D point cloud 202 as an input and accesses a sequence 204 of 3D point clouds. In some non-limiting embodiments of the present technology, the given 3D point cloud 202 can be part of the sequence 204 of 3D point clouds. The sequence 204 includes one or more 3D point clouds ordered chronologically. More specifically, each 3D point cloud noted $P_i$ is associated with a timestamp i that may be indicative of a time of a capture of the 3D point cloud. For example, $P_{\tau-1}$ has been captured immediately subsequently to a capture of $P_{\tau-2}$. The given 3D point cloud 202 may be referred to as a "current" 3D point cloud $P_\tau$.

Broadly speaking, the variable aggregation pipeline 200 may be used to determine, for a given object, a number of 3D point clouds of the sequence 204, and data points thereof to be added to the current 3D point cloud 202 for forming an augmented representation of the object.

In this implementation, each object of the scene and represented by a corresponding set of data points by at least some of the 3D point clouds is associated with a bounding box. A bounding box can be defined as a geometric shape that encloses or surrounds an object or a group of objects in a digital image. The bounding box of a given object in a given 3D point cloud has a corresponding position (e.g. in world coordinates), dimensions, heading and velocity. The velocity corresponds to a velocity of the correspond object at a time of the capture of the 3D point cloud. It should be noted that the given object may also have additional dynamic parameters associated with data points representative thereof. For example, a dynamic parameter of the object may be a velocity thereof, an object type of the object, a size of the object, a current location of the object (expressed, for example, by current coordinates of the object in a coordinate system associated with the object and/or the scene), a number of data points representative of the object in the given 3D point cloud and an occlusion level of the object. In some non-limiting embodiments of the present technology, the occlusion level of the object can be determined by determining a percentage of 3D points within the bounding box defined around the object that are not occluded by bounding boxes associated with other objects in the scene.

For a given object (e.g. a pedestrian) of the scene identified in the current 3D point cloud 202, the bounding box corresponding to this object is identified in the previous 3D point cloud $P_{t-1}$. In the following description, the bounding box at timestamp $\tau$ is noted $b_\tau$. Therefore, the variable aggregation pipeline 200 determines the bounding box $b_{\tau-1}$ at operation 206. A dynamic parameter of the object is also determined in the previous 3D point cloud $P_{\tau-1}$ at operation 206 of the variable aggregation pipeline 200. In this illustrative example, the dynamic parameter is a velocity of the object. Therefore, a velocity $v_{\tau-1}$ is determined at operation 206.

In this implementation, determining the velocity of the object may be used to approximate locations of previously detected objects in the current frame using a constant velocity motion model, thereby facilitating the aggregation of each region separately, and determine a number n of frames (i.e., 3D point clouds) utilized in the aggregation process as will be described in greater detail herein after.

In use, at timestamp $\tau$, the current 3D point cloud 202 $P_\tau$ is processed using subsequent 3D point clouds in the sequence 204. More specifically, for a given object having a bounding box $b_\tau$ in the current 3D point cloud 202 $P_\tau$, a previously detected bounding box $b_{\tau-1}:=(x_{\tau-1}, l_{\tau-1}, w_{\tau-1}, h_{\tau-1}, \theta_{\tau-1}, v_{\tau-1})$ in the coordinate system of the current frame (i.e. $P_\tau$) has a position denoted by $x_{\tau-1}$, dimensions $(l_{\tau-1}, w_{\tau-1}, h_{\tau-1})$, heading $\theta_{\tau-1}$, and estimated velocity $v_{\tau-1}$. It should be noted that a different dynamic parameter could be used here instead of the velocity $v_{\tau-1}$.

In this implementation, a number of frames n (i.e., a number of 3D point clouds of the sequence 204) used to aggregate the points of the given object is determined by its previously estimated speed $|v_{\tau-1}|$, expressed as $n=\eta(|v_{\tau-1}|)$, where $\eta$ is a function. It can be said that $\eta$ serves as a hyperparameter that can be empirically determined from models trained with varying degrees of aggregation.

In some implementations, the function $\eta$ may be expressed as:

$$\eta(|v|) = \min\left(\frac{1}{\alpha|v|} + n_{min}, n_{max}\right) \tag{1}$$

where $\alpha$ is a hyperparameter controlling the shape of $\eta$, and hence the trade-off between static and dynamic performance. Parameters $n_{min}$ and $n_{max}$ are pre-determined minimum and maximum number of frames used in the variable aggregation pipeline 200. In this implementation, $n_{min}$ is greater than 1.

The variable aggregation pipeline 200 further includes determining, at operation 208, a region of interest in the current 3D point cloud 202 for the given object. The region of interest is based, at least in part, on the dynamic parameters of the object in the previous 3D point cloud $P_{\tau-1}$ of the sequence 204. More specifically, in this implementation, an approximate location $\hat{x}_\tau^*$ of the object at the current timestamp $\tau$ may be expressed as $$\hat{x}_\tau^* = x_{\tau-1} + v_{\tau-1}/f \tag{2}$$

where f is a frame rate of a capturing device that capture the sequence of 3D point cloud 204.

In this implementation, in order to encompass all the points representative of the object, including data points belonging to 3D point clouds of the sequence 204 that could potentially fall outside of the bounding box $b_\tau$, an aggregation region is defined based on the dynamic parameter (for example, the velocity) of the object and the number of frames n used in the aggregation. More specifically, the aggregation region $\hat{b}_\tau := (\hat{x}_\tau, \hat{l}_\tau, \hat{w}_\tau, \hat{h}_\tau, \hat{\theta}_\tau)$ for the given object is defined, in this implementation, as:

$$\hat{x}_\tau = \hat{x}_\tau^* - \frac{v_{\tau-1} \cdot (\eta(|v_{\tau-1}|) - 1)}{2f} \tag{3}$$

$$\hat{l}_\tau = \sigma \cdot l_{\tau-1} + \frac{|v_{\tau-1}| \cdot (\eta(|v_{\tau-1}|) - 1)}{f} \tag{4}$$

$$\hat{w}_\tau = \sigma \cdot w_{\tau-1} \tag{5}$$

$$\hat{h}_\tau = \sigma \cdot h_{\tau-1} \tag{6}$$

$$\hat{\theta}_\tau = \sigma \cdot \theta_{\tau-1} \tag{7}$$

where $\sigma \geq 1$ is the enlargement factor that adds a margin to the aggregation region. It should be noted that the second term in Equation (4) is used to enlarge the length of the object to include potential misaligned "smudges" from object motion. Accordingly, the center of the aggregation region is adjusted in Equation (3).

Therefore, a number of 3D point clouds used for aggregation of data points representative of the given object is determined based on characteristics (e.g. dynamic parameters) of said given object. Two objects of a same scene may thus be reconstructed using a different number of 3D point clouds.

More specifically, with back reference to FIG. 2, the aggregation region is defined at operation 208 based on the bonding box of the object and a velocity thereof for the preceding frame $\tau$-1. In this example, the aggregation region for the given object may be defined as $\hat{b}_\tau = b_{\tau-1} + \delta \cdot v_{\tau-1}$ where $\tau$ is a time difference between the two consecutive time-stamps. Data points of the n preceding 3D point clouds of the sequence 204 that are located within the aggregation region may therefore be aggregated to the current 3D point cloud 202 at operation 210 to form an augmented set 250 of data points representative of the object.

Figure 3:
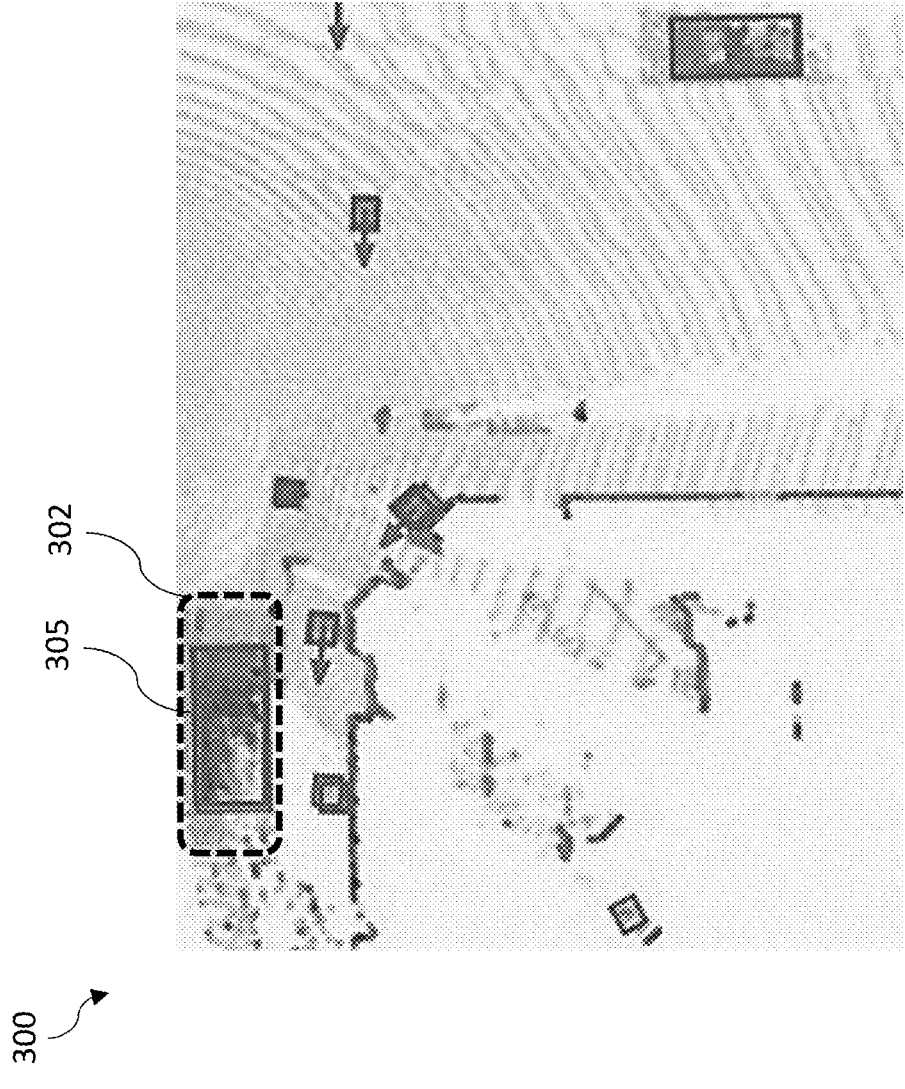
FIG. 3 illustrates an illustrative example of an aggregated 3D point cloud generated using the pipeline of FIG. 2 in accordance with at least some non-limiting implementations of the present technology.

FIG. 3 illustrates an illustrative example of an aggregated 3D point cloud 300 in accordance with at least some non-limiting implementations of the present technology. In this example, the aggregated 3D point cloud 300 includes an object 304 associated with an aggregation region 302 in which data points of $n_{obj}$ preceding 3D point clouds of the sequence 204 are aggregated. The object 304 is a car in this example. It can be seen that at least a portion road section of the scene that includes the object 304 has not been aggregated (i.e. that representation thereof relies on the current 3D point cloud only).

Figure 4:
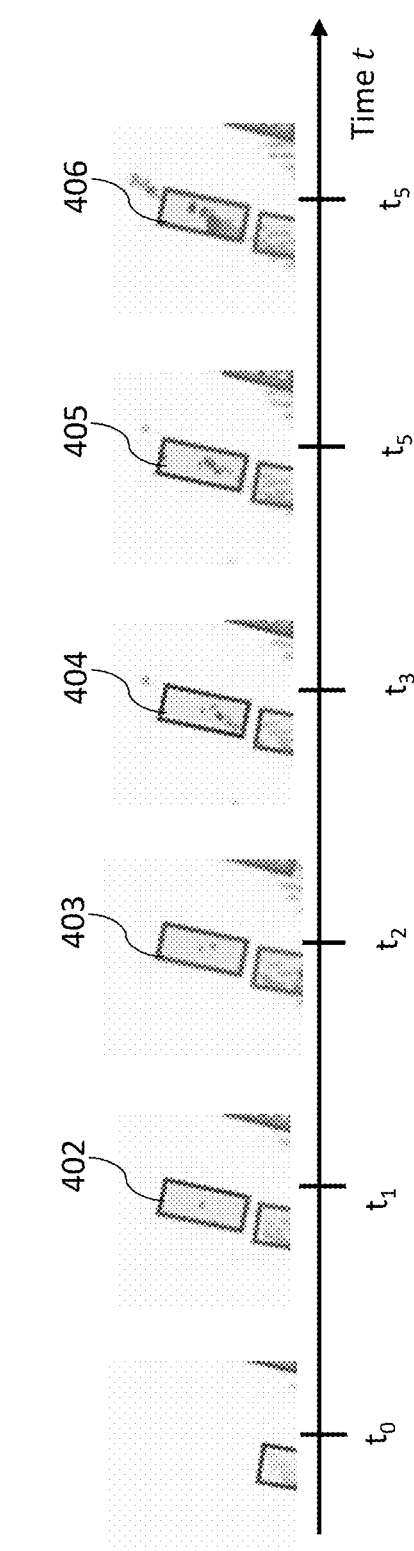
FIG. 4 illustrates an illustrative example of data points representative of emerging objects.

Aggregation techniques may handle the aggregation of previously detected objects but may not consider emerging objects that have not been detected in previous frames (i.e. that are not represented by data points in preceding 3D point clouds). FIG. 4 shows an example of an emerging object through time by appearance of data points in box 402 to 406, respectively corresponding to moment in time $t_1$ to $t_5$. It should be noted that each timestamp $t_1$ to $t_5$ corresponds to a given 3D point cloud. In response, developers of the present technology have devised a strategy to aggregate the rest of the point cloud in a way to ensure that points belonging to these emerging objects are retained.

Broadly speaking, an aspect of the present technology is to eliminate irrelevant background points while retaining those associated with emerging objects. To do so, 3D point clouds are filtered using a Range Image-based Filtering (RIF) and before aggregation.

Figure 5:
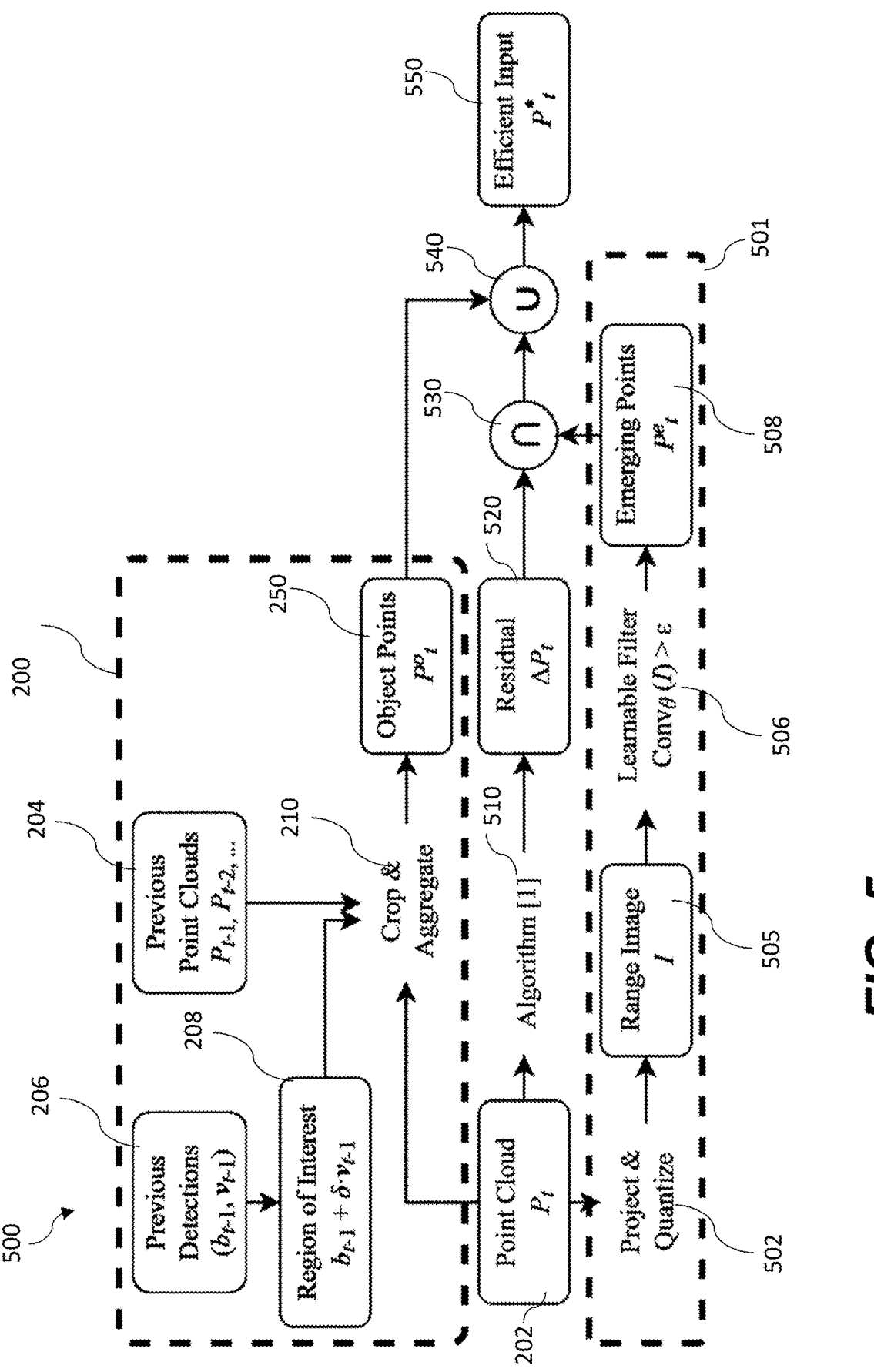
FIG. 5 illustrates an overall reconstruction pipeline for generated augmented 3D point cloud in accordance with at least some non-limiting implementations of the present technology.

FIG. 5 illustrates a reconstruction pipeline 500 for generating augmented 3D point cloud in accordance with at least some non-limiting implementations of the present technology.

The reconstruction pipeline 500 includes the variable aggregation pipeline 200 and a filtering pipeline 501. More specifically, the augmented set 250 of data points is generated as previously described. In parallel or subsequently, the filtering pipeline 501 includes a projection and quantization operation 502 applied on the current 3D point cloud 202 to generate a Range Image (RI) 505. In this implementation, each pixel of the RI 505 represents the distance from an observer to the corresponding point in the scene. In various non-limiting embodiments of the present technology, the projection and quantization operation 502 can include, without limitation, a bird's eye view projection the current 3D point cloud 202, a cylindrical projection of the current 3D point cloud 202, and a spherical projection of the current 3D point cloud 202. For example, in some non-limiting embodiments of the present technology, the projection and quantization operation 502 can be implemented as described in detail in an article entitled "*Detailed Analysis on Generating the Range Image for LiDAR Point Cloud Processing*," authored by Wu et al., and published on May 21, 2021, by College of Intelligence Science and Technology, the content of which is incorporated herein by reference in its entirety.

For example, the RI 505 may include a structured representation of the 3D point cloud 202, where each pixel encodes the range and optionally other point features. In this example, the RI 505 may be obtained through spherical projection and quantization during operation 502. In some implementations, the current 3D point cloud 202 may be projected onto a downsized range image for increasing computing efficiency of the filtering pipeline 501.

The filtering pipeline 501 further includes a filtering operation 506 executed on the RI 505 to obtain a set of emerging points 508, that is, those, representative of emerging, previously undetected, objects. In some implementations, a Range Image filter (RIF) executed at the filtering operation 506 uses a lightweight per-pixel classification network. For example, said network may include two-dimensional (2D) convolutional layers to minimize a computational overhead. In this example, the classification network is a convolutional network with parameters θ is applied to RI to identify emerging data points $$P_\tau^e$$

using a pre-determined threshold ε:

$$Conv_\theta(RI) > \varepsilon$$

In this implementation, the RIF is trained using data points belonging to emerging objects as positive samples. The positive samples may be expanded to incorporate detection characteristics for a given model. Specifically, the following objects may be considered as emerging and their corresponding data points used as positive training samples:

- objects that appear for the first time (based on ground truth) or have not been detected by a pre-trained model,
- objects that re-appear after being fully occluded or have not been detected after reappearing, and
- objects within a pre-determined number of frames after their initial detection over the sequence 204.

In other words, it can be said that the RIF may be trained to retain not only points from the first appearance of the object, but also object points from additional frames, until a stable detection can be achieved.

In parallel or subsequently, an algorithm 510 is executed onto the current 3D point cloud 202 to determine residual data points 520 thereof. In the context of the present specification, the term "residual data points," such as the residual data points 520, denotes data points that are indicative of a difference between data point distributions of two consecutive frames. The residual data points 520 can be initially unobserved within a given frame as they indicate the difference between the frames. To determine the residual data points 520, the algorithm 510 can be configured to remove static data points in a given pair of consecutively following frames, thus retaining only data points representative of dynamic objects that are determined as being the residual data points 520. In some non-limiting embodiments of the present technology, a pseudo-code of the algorithm 510 can look as follows:

Algorithm 1: Variable Aggregation (VA)

$$\text{Input:} \begin{cases} \text{point clouds } P_{\tau-n_{max}+1}, \dots, P_\tau \\ \text{ego poses } T_{\tau-n_{max}+1}, \dots, T_\tau \\ \text{previous detections } b_{\tau-1} \end{cases}$$

Object: aggregated object points $P_\tau^{obj}$

Initialize $P_\tau^{obj}$ to be an empty point cloud

Compute $b_\tau$ from $b_{\tau-1}$ using Equations (2) to (7)
for i ← 0 to $n_{max} - 1$ do $\lceil P_{\tau-i}^{corr} \leftarrow P_{\tau-i}(T_\tau^{-1} T_{\tau-i})^T$ $\mid \hat{b}_\tau^i \leftarrow \{\hat{b}_\tau \mid \hat{b}_\tau \in \hat{b}_\tau, \eta(|v_{\tau-1}|) > i\}$ $\lfloor P_\tau^{obj} \leftarrow P_\tau^{obj} \oplus \text{Crop}\left(P_{\tau-i}^{corr}, \hat{b}_\tau^i\right)$ return $P_\tau^{obj}$ It can thus be said that residual data points $\Delta P_\tau$ are identified by $$\Delta P_\tau = P_\tau \backslash (P_\tau \cap \left( \bigcup_{i=1}^B P_{\tau-i} \right))$$

using the algorithm 510.

Intersection between the residual data points $$\Delta P_\tau$$

and the emerging data points $$P_\tau^e$$

is determined at operation 530 and further aggregated to the augmented set 250 of data points at operation 540 to form an augmented 3D point cloud 550.

Figure 6:
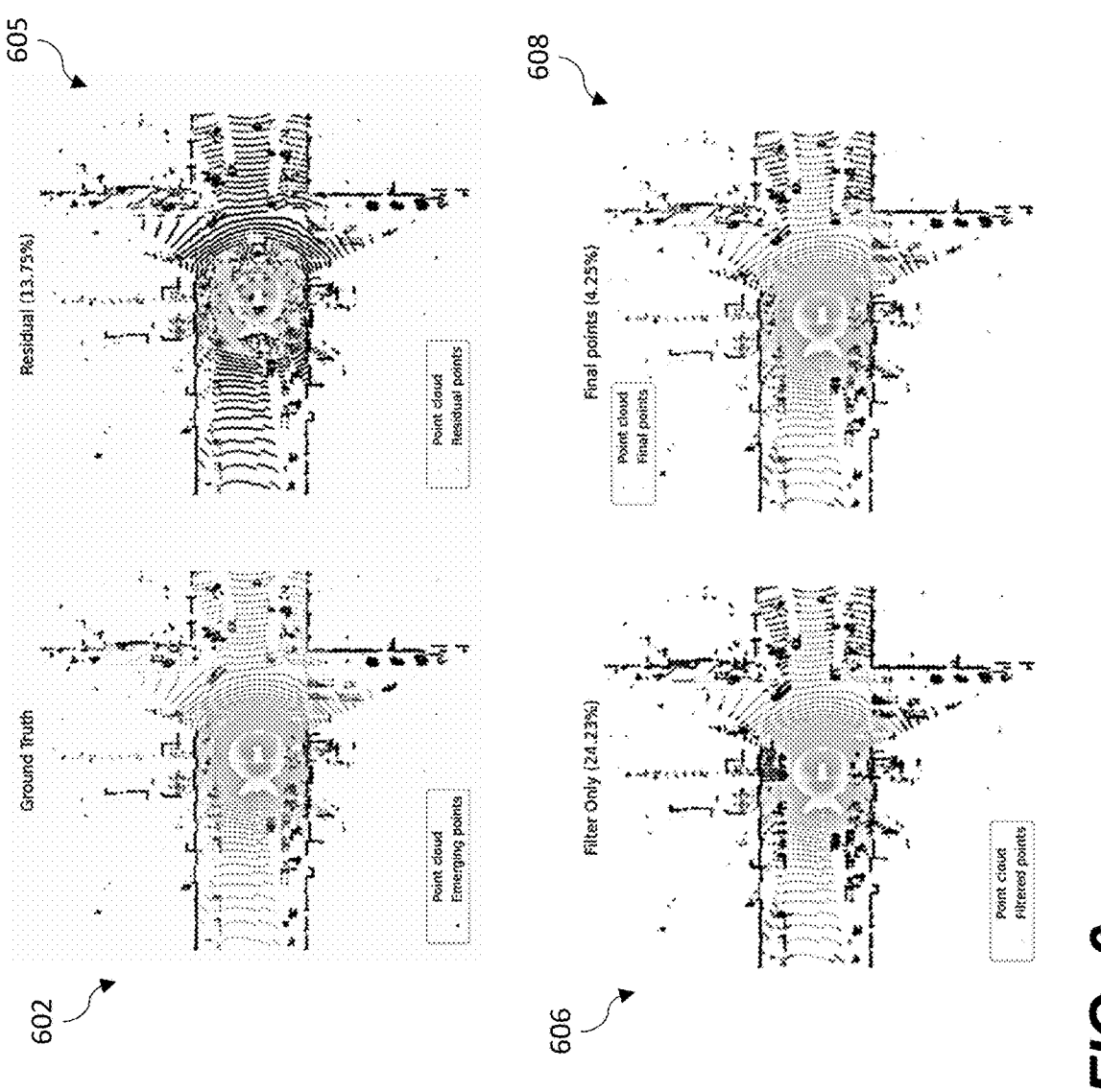
FIG. 6 illustrates four 3D point clouds with respective residual points and formed using different settings of the variable aggregation pipeline of FIG. 2 in accordance with at least some non-limiting implementations of the present technology.

FIG. 6 shows experimental results of the present technology. More specifically, FIG. 6 shows a representation 602 of a ground truth 3D point cloud of a given scene. In this given example, the scene is a road intersection. Representation 605 represents corresponding residual data points $\Delta P_\tau$ of the ground truth 3D point cloud, representation 606 represents filtered emerging data points $$P_\tau^e$$

of the ground truth 3D point cloud, and representation 608 represents an intersection of the residual data points and the emerging data points $$\Delta P_\tau \cap P_\tau^e.$$

Numbers in parenthesis in FIG. 6 indicate the percentages of the original ground truth 3D point cloud retained.

Method Description

Figure 7:
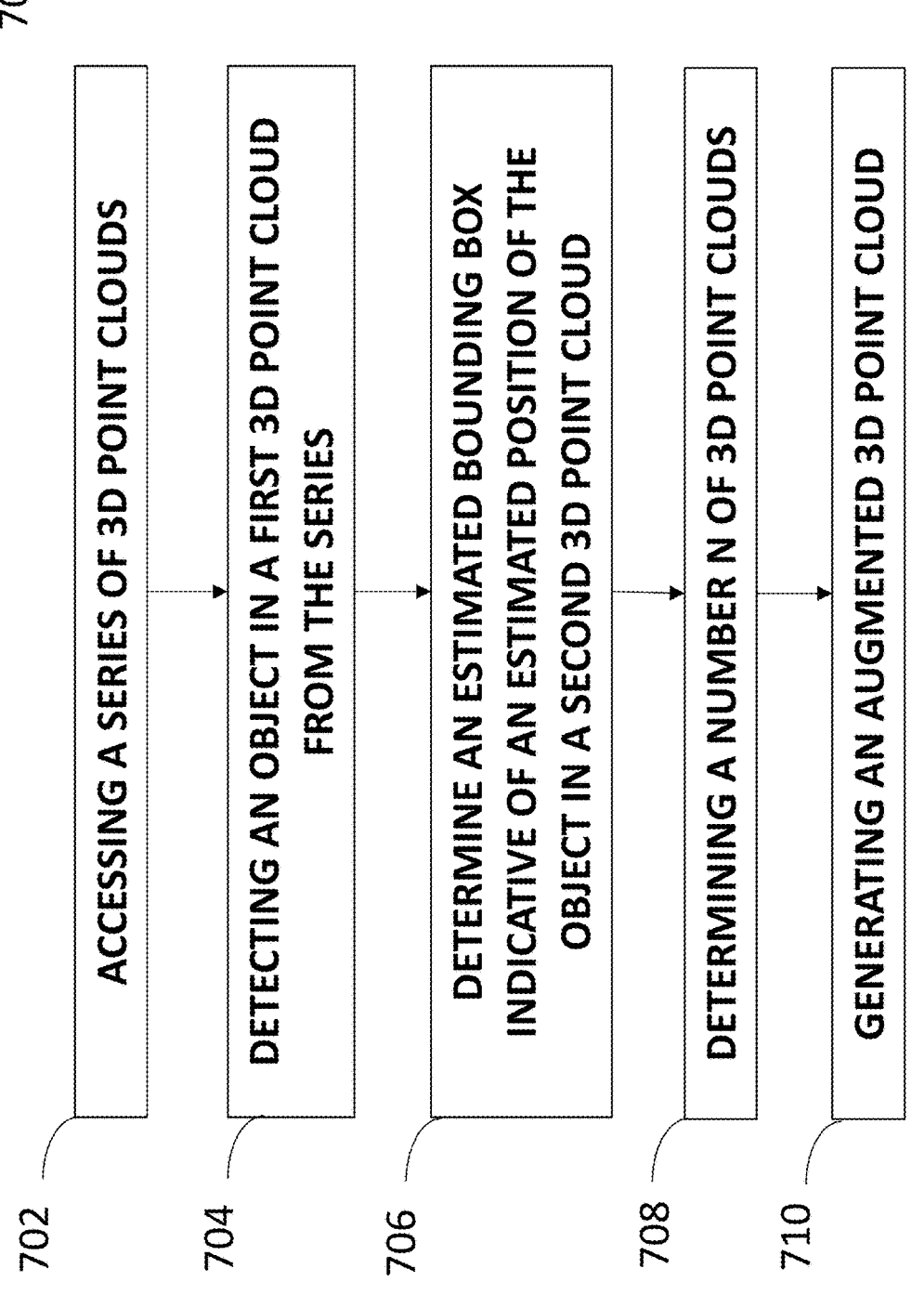
FIG. 7 is a scheme-block illustration of a method executed by a processor of the computing device of FIG. 1, in accordance with at least some non-limiting implementations of the present technology.

In some implementations of the present technology, the processor 110 is configured to execute a method 700 for generating a three-dimensional (3D) representation of a scene. In some implementations, the given object is at least one of a text-based object, an audio object, and a video object. A scheme-block illustration of operations of the method 700 is depicted in FIG. 7. It is contemplated that the method 700 can be executed by an electronic device having the computing environment 100 that has been described above with reference to FIG. 1. In some implementations, one or more steps of the method 700 may be executed by one or more physical processors, such as the processor 110. For example, the processor 110 may be communicatively coupled over a network for performing one or more steps in a distributed manner. It is therefore contemplated that one or more steps from the method 700 may be executed by distinct electronic devices, without departing from the scope of the present technology.

Step 702: Accessing A Series OF 3D Point Clouds

The method 700 commences at step 702 with the processor 110 being configured to receive a series of 3D point clouds, such as the sequence 204 of 3D point clouds as described above with reference to FIG. 2. Each 3D point cloud comprises a plurality of data points and is associated with a respective timestamp indicative of a corresponding moment in time.

Step 704: Detecting an Object in A First 3D Point Cloud From the Series

At step 704, according to certain non-limiting embodiments of the present technology, the processor 110 can be configured to select a first 3D point cloud from the sequence 204 of 3D point clouds—such as the current point cloud 202 mentioned above. In some non-limiting embodiments of the present technology, the processor 110 can be configured to select the latest 3D point cloud from the sequence 204 as being the current 3D point cloud 202.

Further, according to certain non-limiting embodiments of the present technology, the processor 110 can be configured to detect, in the current 3D point cloud 202, a given object. To do so, as mentioned further above, the processor 110 can be configured to apply, to the current 3D point cloud 202, one or more 3D object detection algorithms. As a result, according to certain non-limiting embodiments of the present technology, the processor 110 can be configured to generate a bounding box indicative of a position and dimensions of the object in the current 3D point cloud 202 at the respective timestamp τ. Further, in some non-limiting embodiments of the present technology, processor 110 can be configured to determine the dynamic parameter of the object at the respective timestamp, such as the velocity of the object, as described above with respect to the operation 206 of the variable aggregation pipeline 200.

Step 706: Determining an Estimated Bounding Box Indicative of an Estimated Position of the Object in A Second 3D Point Cloud At step 706, according to certain non-limiting embodiments of the present technology, the processor 110 can be configured to, upon receiving a second 3D point cloud successive to the first 3D point cloud in the series of 3D point clouds, determining an estimated bounding box inductive of an estimated position of the object in the second 3D point cloud based on the bounding box and the dynamic parameter of the object in the first 3D point cloud. In other words, determine, for each 3D point cloud of the sequence 204 preceding the current 3D point cloud 202, a respective estimated bounding box indicative an estimated position of the object on a given preceding 3D point cloud, as described above with respect to operation 206 of the variable aggregation pipeline 200.

In some non-limiting embodiments of the present technology, the processor 110 can be configured to determine the respective estimated bounding box for the object only in the 3D point cloud which immediately precedes to the current 3D point cloud 202 in the sequence 204.

Step 708: Determining A Number N of 3D Point Clouds

At step 708, according to certain non-limiting embodiments of the present technology, the processor 110 can be configured to determine a number N of 3D point clouds from the series of 3D point clouds preceding the second 3D point based on the dynamic parameter of the object in the first 3D point cloud. In other words, determine the number N of 3D point clouds from the sequence 204, preceding to the current 3D point cloud 202, for further use in generating the augmented 3D point cloud 550. In some non-limiting embodiments of the present technology, the processor 110 can be configured to determine the number N based on the dynamic parameter of the object in the 3D point cloud, which immediately precedes to the current 3D point cloud 202 in the sequence 204. In some non-limiting embodiments of the present technology, to do so, the processor 110 can be configured for using the function η, expressed by Equation (1) mentioned above.

Step 710: Generate an Augmented 3D Point Cloud

Finally, at step 710, according to certain non-limiting embodiments of the present technology, the processor 110 can be configured to generate an augmented 3D point cloud by aggregating data points representative of the object from the N 3D point clouds preceding the second 3D point cloud in the series of 3D point clouds with data points of the second 3D point cloud. In other words, to aggregate the data points in the N number of 3D point clouds preceding to the current 3D point cloud 202 to generate the augmented set 250 of data points defining the augmented 3D point cloud 550 representative of the object, as described in detail above with respect to the operation 210 of the variable aggregation pipeline 200.

The so determined augmented 3D point cloud 550 can further be used for generating driving scenarios for an autonomous vehicle.

While the above-described implementations have been described and shown with reference to particular operations performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

While the application examples of the technology described in the present disclosure is Autonomous Driving Systems (ADS), it may be used and extended to various other domains, including robotics, cinematography, visual effects, advertising, military applications, AR/VR, construction, real estate (for planning, buying, selling), and medical scene/image 3D reconstruction, among others, wherein camera images (and/or LiDAR data points) serve as inputs. This proposed technology demonstrates capability in swiftly and realistically reconstructing and simulating scenarios featuring static backgrounds and dynamic actors.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for generating a three-dimensional (3D) representation of a scene, the method comprising:

accessing a series of 3D point clouds, each 3D point cloud comprising a plurality of data points and being associated with a respective timestamp;

detecting an object in a first 3D point cloud from the series, the detecting comprising:

determining a bounding box indicative of a position of the object in the first 3D point cloud; and determining a dynamic parameter of the object at the respective timestamp;

upon receiving a second 3D point cloud successive to the first 3D point cloud in the series of 3D point clouds:

determining an estimated bounding box indicative of an estimated position of the object in the second 3D point cloud based on the bounding box and the dynamic parameter of the object in the first 3D point cloud;

determining a number N of 3D point clouds from the series of 3D point clouds preceding the second 3D point based on the dynamic parameter of the object in the first 3D point cloud; and generating an augmented 3D point cloud by aggregating data points representative of the object from the N 3D point clouds preceding the second 3D point cloud in the series of 3D point clouds with data points of the second 3D point cloud.

2. The method of claim 1, wherein the N 3D point clouds are a subseries of the series of 3D point clouds immediately preceding the second 3D point cloud.

3. The method of claim 1, wherein, in a given 3D point cloud, each object is associated with a bounding box delimiting data points of the given 3D point cloud representative of the object, a size of the bounding box on the second 3D point cloud being adjusted based on the dynamic parameter of the object determined using data points of the first 3D point cloud.

4. The method of claim 3, further comprising adjusting a position of the bounding box of the object based on the estimated position thereof and the dynamic parameter of the object determined using data points of the first 3D point cloud.

5. The method of claim 4, wherein the 3D point cloud are representations of the scene captured at a pre-determined rate f, and wherein the adjusting the position of the bounding box is further based on the pre-determined rate f.

6. The method of claim 1, wherein the dynamic parameter of the object is selected from a group of parameters comprising: a velocity of the object; an object type of the object, a size of the object, a location of the object, a number of data points representative of the object on the second 3D point cloud and an occlusion level of the object.

7. The method of claim 6, wherein the dynamic parameter of the object is a velocity thereof, and wherein the number N is determined according to a formula:

$N=\eta(|v_{\tau-1}|)=\min(1/\alpha|v_{\tau-1}|+n_{min}; n_{max})$, where $\alpha$ is a predetermined hyperparameter, $v_{\tau-1}$ is the velocity of the object determined on the first 3D point cloud and $n_{min}$ and $n_{max}$ are respectively a first and a second predetermined thresholds.

8. The method of claim 1, wherein the series of 3D point clouds are representations of the scene captured at a predetermined rate f, and wherein determining the estimated position of the object is further based on the pre-determined rate f.

9. The method of claim 1, further comprising:

generating a two-dimensional (2D) range image based on a projection of the aggregated data points on a 2D plane; and transmitting the 2D image to an object-detection module.

10. The method of claim 1, further comprising:

identifying residual data points among the data points of the second 3D point cloud based on the series of 3D point clouds;

determining a range image based on the data points of the second 3D point cloud;

identifying emerging data points among the data points of the second 3D point cloud using the range image; and determining an intersection between the emerging data points and the residual data points as being data points representative of the object.

11. A system for generating a three-dimensional (3D) representation of a scene, the system comprising a controller and a memory storing a plurality of executable instructions which, when executed by the controller, cause the system to:

access a series of 3D point clouds, each 3D point cloud comprising a plurality of data points and being associated with a respective timestamp;

detect an object in a first 3D point cloud from the series, the detecting comprising:

determine a bounding box indicative of a position of the object in the first 3D point cloud; and determine a dynamic parameter of the object at the respective timestamp;

upon receiving a second 3D point cloud successive to the first 3D point cloud in the series of 3D point clouds:

determine an estimated bounding box indicative of an estimated position of the object in the second 3D point cloud based on the bounding box and the dynamic parameter of the object in the first 3D point cloud;

determine a number N of 3D point clouds from the series of 3D point clouds preceding the second 3D point based on the dynamic parameter of the object in the first 3D point cloud; and generate an augmented 3D point cloud by aggregating data points representative of the object from the N 3D point clouds preceding the second 3D point cloud in the series of 3D point clouds with data points of the second 3D point cloud.

12. The system of claim 11, wherein the N 3D point clouds are a subseries of the series of 3D point clouds immediately preceding the second 3D point cloud.

13. The system of claim 11, wherein, in a given 3D point cloud, each object is associated with a bounding box delimiting data points of the given 3D point cloud representative of the object, a size of the bounding box on the second 3D point cloud being adjusted based on the dynamic parameter of the object determined using data points of the first 3D point cloud.

14. The system of claim 13, wherein the system is further configured to adjust a position of the bounding box of the object based on the estimated position thereof and the dynamic parameter of the object determined using data points of the first 3D point cloud, adjusting the position of the bounding box being based on the pre-determined rate f at which the series of 3D point clouds has been captured.

15. The system of claim 11, wherein the dynamic parameter of the object is selected in a group of parameters comprising: a velocity of the object; an object type of the object, a size of the object, a location of the object, a number of data points representative of the object on the second 3D point cloud and an occlusion level of the object.

16. The system of claim 15, wherein the dynamic parameter of the object is a velocity thereof, and wherein the number N is determined according to a formula:

$N = \eta(|v_{\tau-1}|) = \min(1/\alpha|v_{\tau-1}| + n_{min}; n_{max})$, where $\alpha$ is a predetermined hyperparameter, $v_{\tau-1}$ is the velocity of the object determined on the first 3D point cloud and $n_{min}$ and $n_{max}$ are respectively a first and a second predetermined thresholds.

17. The system of claim 11, wherein the series of 3D point clouds are representations of the scene captured at a predetermined rate f, and wherein determining the estimated position of the object is further based on the pre-determined rate f.

18. The system of claim 11, wherein the system is further configured to:

generate a two-dimensional (2D) range image based on a projection of the aggregated data points on a 2D plane; and transmit the 2D image to an object-detection module.

19. The system of claim 11, wherein the system is further configured to:

identify residual data points among the data points of the second 3D point cloud based on the series of 3D point clouds;

determine a range image based on the data points of the second 3D point cloud;

identify emerging data points among the data points of the second 3D point cloud using the range image; and determine an intersection between the emerging data points and the residual data points as being data points representative of the object.

20. A non-transitory computer readable medium storing executable instructions for causing one or more computer processors to:

access a series of 3D point clouds, each 3D point cloud comprising a plurality of data points and being associated with a respective timestamp;

detect an object in a first 3D point cloud from the series, the detecting comprising:

determine a bounding box indicative of a position of the object in the first 3D point cloud; and determine a dynamic parameter of the object at the respective timestamp;

upon receiving a second 3D point cloud successive to the first 3D point cloud in the series of 3D point clouds:

determine an estimated bounding box indicative of an estimated position of the object in the second 3D point cloud based on the bounding box and the dynamic parameter of the object in the first 3D point cloud;

determine a number N of 3D point clouds from the series of 3D point clouds preceding the second 3D point based on the dynamic parameter of the object in the first 3D point cloud; and generate an augmented 3D point cloud by aggregating data points representative of the object from the N 3D point clouds preceding the second 3D point cloud in the series of 3D point clouds with data points of the second 3D point cloud.

* * * * *